(12) United States Patent
Hanson et al.

(10) Patent No.: US 6,903,838 B1
(45) Date of Patent: Jun. 7, 2005

(54) AUTOMATICALLY SPECIFYING ADDRESS WHERE DOCUMENT IS TO BE SENT

(75) Inventors: Angela K. Hanson, Eagle, ID (US); James P. Slupe, Caldwell, ID (US); Paul L Jeran, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/468,257

(22) Filed: Dec. 20, 1999

(51) Int. Cl.[7] .............................. G06F 15/00; H04N 1/00
(52) U.S. Cl. ...................... 358/1.15; 358/402; 358/407; 358/440; 709/217; 709/219
(58) Field of Search ................................ 358/1.15, 402, 358/442, 407, 405, 440, 468; 707/1, 3, 4, 10; 382/101, 61; 370/248, 352, 392, 471, 401; 709/217, 219, 251

(56) References Cited

U.S. PATENT DOCUMENTS

| | | | | |
|---|---|---|---|---|
| 3,763,467 A | * | 10/1973 | Cash et al. ......... | 340/146.3 WD |
| 4,633,507 A | * | 12/1986 | Cannistra et al. ............. | 382/61 |
| 4,860,250 A | * | 8/1989 | Gurd et al. ................. | 364/900 |
| 5,247,591 A | * | 9/1993 | Baran ........................ | 382/179 |
| 5,422,733 A | * | 6/1995 | Merchant et al. ........... | 358/407 |
| 5,461,488 A | * | 10/1995 | Witek ......................... | 358/402 |
| 5,506,697 A | * | 4/1996 | Li et al. ..................... | 358/448 |
| 5,513,264 A | * | 4/1996 | Wang et al. ................. | 380/51 |
| 5,684,865 A | * | 11/1997 | Mohtashemi et al. ....... | 379/100 |
| 5,692,073 A | * | 11/1997 | Cass .......................... | 382/219 |
| 5,826,034 A | * | 10/1998 | Albal ......................... | 709/239 |
| 5,862,243 A | * | 1/1999 | Baker et al. ................ | 382/101 |
| 5,869,819 A | * | 2/1999 | Knowles et al. ............ | 235/375 |
| 5,892,900 A | | 4/1999 | Ginter et al. ............... | 395/186 |
| 5,974,177 A | * | 10/1999 | Krtolica ..................... | 382/202 |
| 6,023,345 A | * | 2/2000 | Bloomfield ................. | 358/402 |
| 6,081,827 A | * | 6/2000 | Reber et al. ............... | 709/200 |
| 6,088,127 A | * | 7/2000 | Pieterse ..................... | 358/407 |
| 6,301,245 B1 | * | 10/2001 | Luzeski et al. ............. | 370/352 |
| 6,434,561 B1 | * | 8/2002 | Durst, Jr. et al. ............ | 707/10 |

FOREIGN PATENT DOCUMENTS

WO    WO-96/41463 A1 * 12/1996 ............ H04N/1/00

\* cited by examiner

Primary Examiner—Joseph R. Pokrzywa

(57) ABSTRACT

A method for providing automatic communication addressing comprising the steps of: locating a communication mark, if one is present, on a medium containing information; obtaining at least one address directly or indirectly from the communication mark; inputting the address into an address function of a communication device; and initiating a communication of the information to the address through the communication device.

8 Claims, 2 Drawing Sheets

AUTOMATICALLY SPECIFYING ADDRESS WHERE DOCUMENT IS TO BE SENT

BACKGROUND OF THE INVENTION

1. Field of the Invention

The present invention relates generally to automated document management systems, and more particularly to a device and method for automatically determining an address where a communication is to be sent and the communication mode by which it is to be sent.

2. Description of the Related Art

In order for a user to send a communication by fax machine, the user must either input the fax number using a numeric control panel, or press a hot key on a control panel for that particular fax number. In either case, the user must know the communication address or number for the location where the document is to be sent. There is currently no method for the user to automatically insert a document into a communication machine such as a fax machine and let the machine determine the address where the document is to be sent.

Likewise, when using e-mail, the user typically relies upon an e-mail software application that allows the user to type in an e-mail address or automatically reply to an e-mail and send the reply to one or more locations. There is currently no method to print the e-mail communication and then, send that printed e-mail document to another address without going back into the e-mail application and sending from within that e-mail application.

SUMMARY OF THE INVENTION

Briefly, the present invention comprises in one embodiment a method for providing automatic communication addressing comprising the steps of: locating a communication mark, if one is present, on a medium containing information; obtaining an address directly or indirectly from the communication mark; inputting the address into an address function of a communication device; and initiating a communication of the information to the address through the communication device.

In a further aspect of the invention, the locating step comprises scanning the medium.

In a further aspect of the present invention, the locating step comprises capturing the communication mark using a frame from a video.

In yet a further aspect of the present invention, the locating step comprises the step of locating the communication mark at a predetermined location on the medium.

In a yet further aspect of the present invention, the locating step comprises locating an address relative to a predetermined mark on the medium.

In a yet further aspect of the present invention, the communication mark includes a first address for a first communication mode, and a second address for a second communication mode.

In a yet further aspect of the present invention, the communication mark includes a designation for a communication mode for the address, and further comprises the step of determining if the communication mode is available at the communication device.

In a yet further aspect of the present invention, the step is provided of adding a communication mark to the information prior to initiating the communication. This communication mark may include new addresses or delete addresses or references thereto from the original communication mark or provide a different set of addresses.

In a yet further aspect of the present invention, the communication mark is a bar code.

In a yet further aspect of the present invention, the communication mark is a reference to a location where an address is stored.

In yet a further aspect of the present invention, the address is accessed over a network.

In a further aspect of the present invention, the address is accessed via a URL address.

In a yet further aspect of the present invention, the method includes the step of storing the address obtained directly or indirectly from said communication mark.

In a yet further aspect of the present invention, the method includes the steps of determining a name of an addressee corresponding to the obtained address, and displaying that addressee name to a user. This aspect may further include the step of allowing the user to add or delete addresses.

In a yet further aspect of the present invention, the step is included of, when it is determined that the communication mode requested is not available at the communication device, sending the address and the information to a different communication device.

In a yet further aspect of the present invention, the obtaining step comprises the step of using hand-writing recognition software to obtain information relative to the address.

In yet a further embodiment of the invention, a system is provided for providing automatic communication addressing comprising: logic for locating a communication mark on a medium containing information; logic for obtaining an address directly or indirectly from the communication mark; logic for inputting the address into an address function of a communication device; and logic for initiating a communication of the information to the address through the communication device.

BRIEF DESCRIPTION OF THE DRAWINGS

The accompanying drawings which are incorporated in and constitute a part of the specification, illustrate a presently preferred embodiment of the invention, and together with the general description given above and the detailed description of the preferred embodiment given below, serve to explain the principals of the invention.

DETAILED DESCRIPTION OF THE PREFERRED EMBODIMENT

Figure 1:
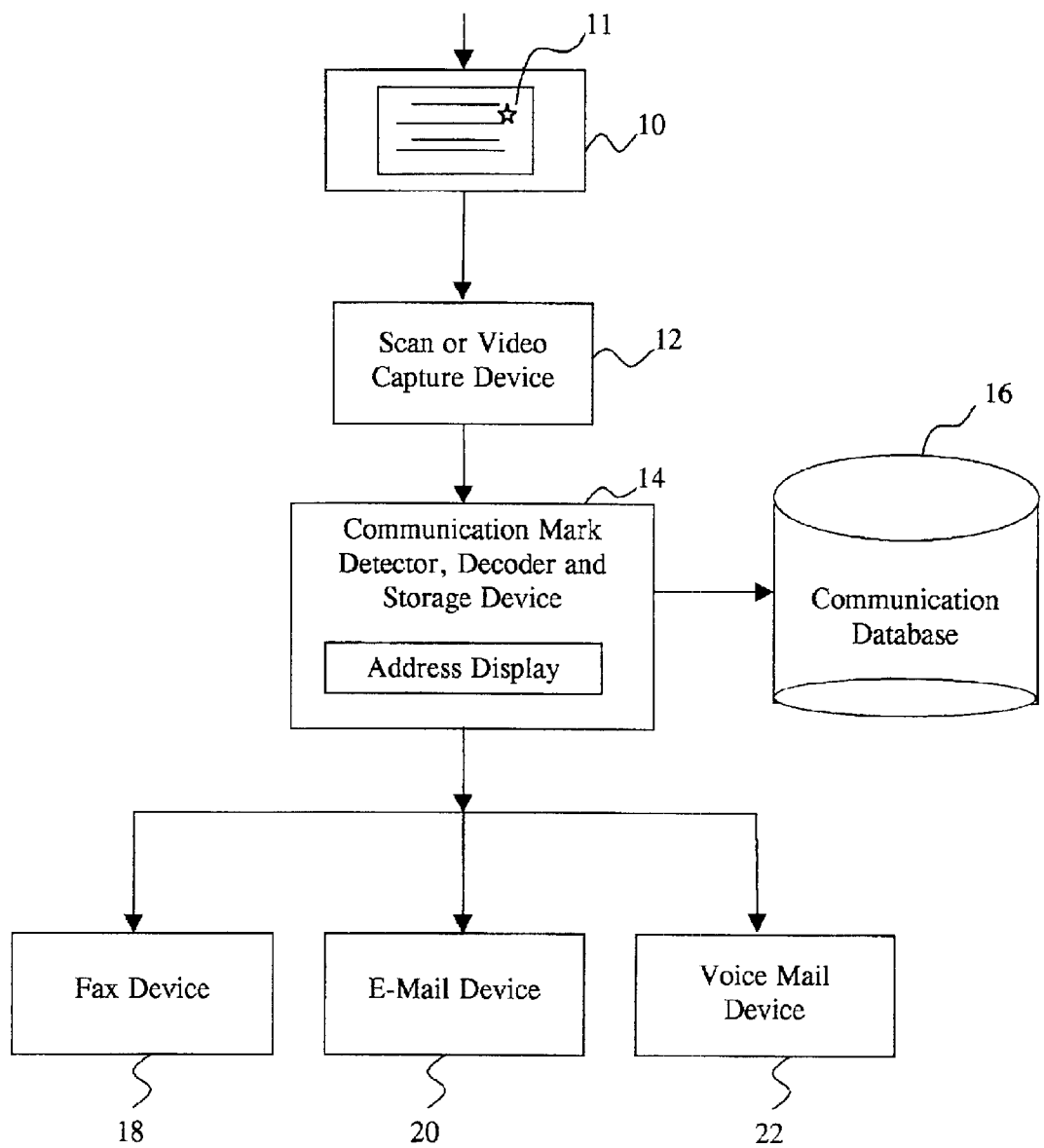
FIG. 1 is a schematic block diagram illustrating the main components of the system for providing automatic communication addressing.

Referring now to FIG. 1, a document medium or a substrate 10 containing a communication mark indicating a communication address or a reference to a data base location where a communication address is located is shown. The communication mark is indicated by reference numeral 11 for purposes of illustration only. The communication mark may be handwritten on the document or may be placed on the document by machine. The communication mark could be in a machine readable code that can be formed on the medium or substrate 10. It should be noted that there are numerous methods available for providing a machine-readable code on a medium or a substrate. One class of methods comprises hiding the code within a primary image. Such hiding can be accomplished by utilizing particular digital encoding, such as, for example, font pattern modifications, including, half-tone screen inter-character spacing modification, or a dithering pattern. Another method is to place the machine-readable code on a portion of a document that is not normally printed upon with a primary image. Such portions can include, for example, one or more of the corners or margins of a document. The machine-readable code can be stored in such portion, as for example by a pattern of dots or lines. Such pattern could, for example, comprise a one-dimensional or two-dimensional bar code. Note that if hidden or camouflaged machine-readable code is used, the camouflaged code can be in the form of half-tone markings within an image prepared on the substrate, or in the form of an ink which is not detectable when viewed with only visible wavelength light, i.e., for example an ink that is detectable only using infrared or ultraviolet wavelengths.

As noted above, the machine-readable code may be located anywhere on the substrate or the medium including the top portion, a bottom portion, side margins of a document. It may also be located in or adjacent to an image like a company logo or within a photograph, or in or adjacent to a copyright notice or a watermark in a background.

In applications where a bar code is utilized, large amounts of data can be encoded by utilizing two-dimensional bar codes. In applications where a person writes the code on the substrate, the code may be machine-readable when read with a machine coupled with a handwriting-recognition software.

In applications where the code of the communication mark on the substrate or medium comprises a reference to a location of data objects in a database, the code may comprise simply a serial number, an access code, or a URL address corresponding to an Internet location at which the data objects are stored. These data objects can then be accessed through a network connection. In particular applications, the machine-readable code can be formed on a substrate with a machine configured to support voice input and then to mark or annotate the substrate for further action/workflow.

The communication mark could be located anywhere on the document. However, it may be preferred to locate the communication mark at a specific location in order to facilitate ease in locating the communication mark. It should be noted that the communication mark could be located at one point or multiple points on the medium or substrate in order to enhance the ability of a device to locate the communication mark.

In a preferred embodiment, the communication mark could indicate the type of communication mode to be used, as well as the address location to be used for that communication mode. Typical communication modes would include fax machines, e-mail communication, and voice mail communication. However, it should be noted that the present invention is not intended to be limited to any particular communication mode.

It should be noted that the communication mark can be placed on the document in a wide variety of manners or by a variety of mechanisms. For example, as noted previously, the communication mark can be handwritten onto the document. Alternatively, the communication mark could be printed on the document by the application used to create the document, or by the driver of the device that printed the document. Alternatively, the communication mark could be embedded in the document by the device that transmitted the document or by the device that received the document. Alternatively, the communication mark could be preprinted on a form/header sheet or a cover sheet.

The document 10 to be communicated is initially provided to a device 12, which could be a scanning device or a video frame capture device. The device 12 functions to capture the information on the document 10 and/or to capture the information at least at a particular location on the document where a communication mark is expected to be located. If the later configuration is utilized, then the scanner or video capture device would capture only a portion of the document or medium or substrate wherein the communication mark is expected to be found.

The captured information including the communication mark is then provided to a communication mark detector and decode device 14. This device 14 may be implemented, in one embodiment, by a general or a special purpose computer having a CPU, memory, input/output and networking devices, and system and application software, or it could be implemented by a device without one or more of the CPU, memory, or networking devices, depending on the configuration environment. The processing unit for the device 14, in a preferred embodiment, searches the captured information to detect a match to a communication mark configuration, and then operates to decode that communication mark. This detection aspect of the device 14 could comprise simply loading the CPU with a hand-writing recognition software, or software for decoding one or two-dimensional bar codes, or for decoding some other type of mark. Typically, the specially programmed decoding application in the device 14 will process the image of the communication mark using a logic corresponding to the logic used to create the communication mark, including the steps of locating the mark and parsing the mark. If the device 14 is unable to locate a communication mark in the information provided to it, then the device 14 may provide an error message which indicates that the communication mark has not been found, and a default processing can be initiated.

It should be noted that the communication mark may include a communication address therein, such as a fax number, or an e-mail address, or a voice mail address, or some other communication mode address. Alternatively, the communication mark may simply be a reference to a database 16 either contained within the device 14 or remote from the device 14. If the database 16 is separated from the device 14, it could be accessed by means of a computer network, such as a LAN, so that all devices that are connected to the network can directly communicate with each other. The network could also include wide area networks (WAN) and other inter-connected networks such as the Internet. Accordingly, the information in the communication mark could comprise either a file name in an electronic database accessible by a network, or a location in the form of a URL (uniform resource locator) that enables the location of a document on the World Wide Web of the Internet. By way of example, this remote database access could be to the address book of a PDA, or an APC. It should be noted that the use of simply a reference to electronic files stored in the database 16 may be particularly convenient where the document 10 is to be communicated to a plurality of different addressees and the space for the mark or the data capacity for the coding type is limited. The use of a reference to a separate database is also convenient when the list of addresses must be updated on a periodic basis.

After the communication mark detector and decode device 14 has determined the communication mode to be utilized and the address within that communication mode, then the information to be transmitted is provided to the designated communication mode. In FIG. 1, by way of example a fax device communication mode 18, an e-mail device communication mode 20, and a voice mail device communication mode 22 are shown.

Figure 2:
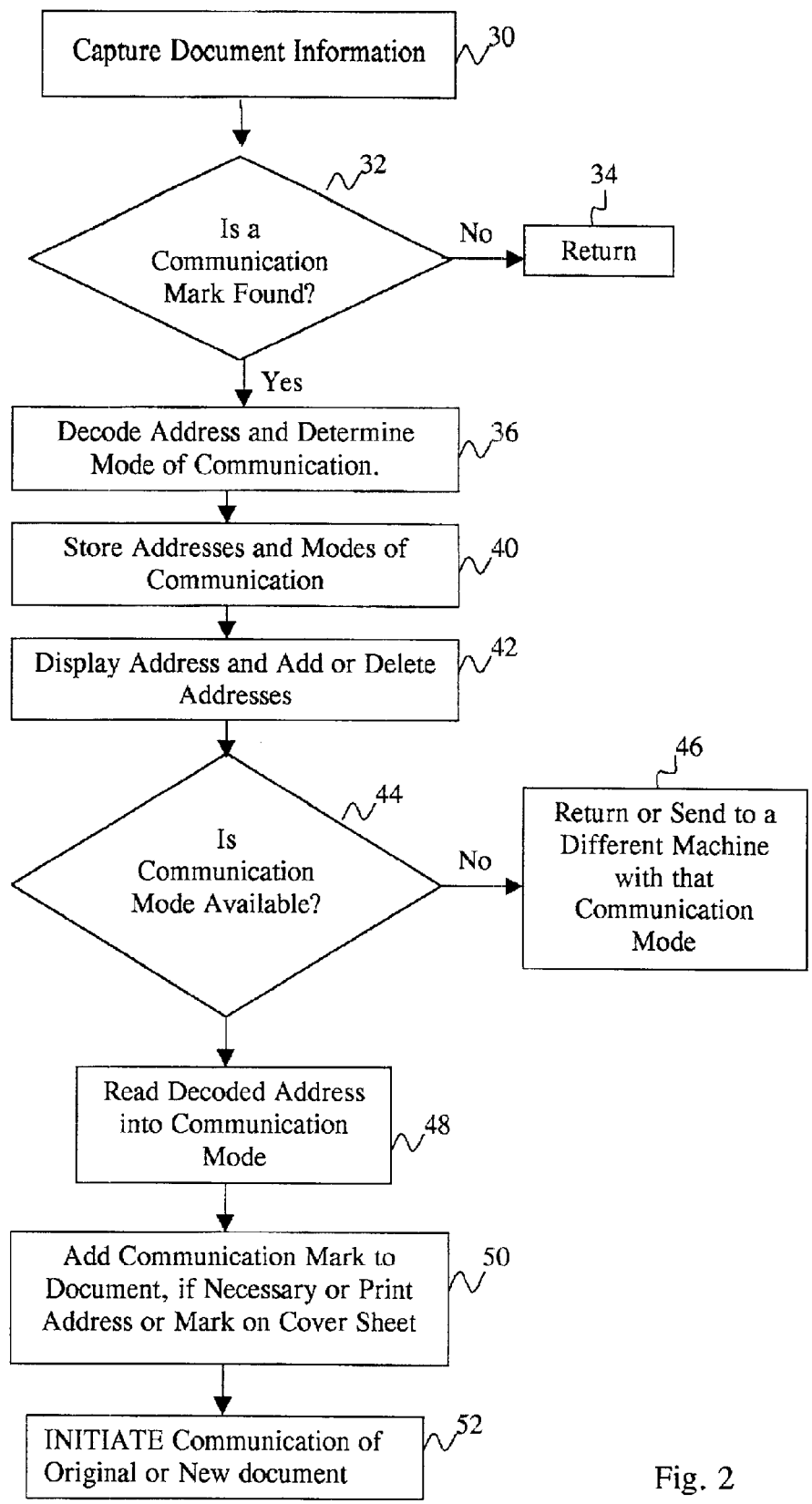
FIG. 2 is a flow diagram illustrating the steps of a process for processing an automatic communication addressing method.

Referring now to FIG. 2, there is shown a flowchart of the execution of software to implement the present invention. The first step 30 in the flowchart is to capture information in the document including any communication mark or marks therein. This can be accomplished, as noted previously, by using a standard scanning system or a video capture device. The execution then moves to the decision block 32, wherein it is determined whether a communication mark has been found in the captured document information. If the answer is NO, then the execution moves to the return block 34 and may generate an error message.

If a communication mark has been found in the captured information, then the execution moves to block 36 wherein the communication mark that has been found is decoded using standard decoding software, as described earlier, and the mode or modes of communication and the addresses and potentially the names of addresses are determined from the mark itself, or by accessing a file in a database or at a URL address via a reference number in the mark.

As an optional step, the execution may then move to block 40 wherein the decoded address/addresses and modes of communication are stored in a local or remote database for future reference.

As a second optional step, the execution may move to block 42 wherein the decoded addresses and/or addresses are displayed and the option is provided to the user to add or delete addresses.

The execution then moves to decision block 44 wherein it is determined whether the communication mode requested is available. If the answer is NO, then the execution moves to block 46, wherein either an error message or some other appropriate message may be generated and displayed, or the document information could be sent to a different machine that includes that the particular communication mode.

If the designated communication mode is available, then the execution moves to block 48 wherein the decoded address is read into the communication mode device that has been designated. By way of example, this communication mode device may be a fax machine, or an e-mail device, or a voice mail device or some other convenient communication mode. The execution may then move to block 50 wherein a communication mark may be added to the document, if necessary. This communication mark could simply duplicate the communication mark that had been previously detected, or it could replace the detected communication mark with a new communication mark which adds new addresses thereto or deletes addresses or provides a new set of addresses, with different modes of communication.

The execution then moves to block 52 wherein the communication is initiated from the communication mode device.

Accordingly, it can be seen that in the case where a user has written a fax number or e-mail address or symbol on a document to be sent, or where a digital mark or bar code has been added to the document, the device can read the number or symbol designating or referencing an address where the document is to be faxed, or e-mailed, and then dial that fax number automatically or address that e-mail address automatically and send the document. Having this communication mark on the document can be used to obtain automatic fax-back or e-mail-back operation.

By way of example, the user may receive a fax from someone and desire to send a reply back to that person or group of persons. The user can simply write on the faxed document they received, and then place the document back into the device. The device of the present invention then reads the fax number from the communication mark and faxes the document back to the original sender.

The same concept applies to e-mail communications wherein the user can print a copy of the e-mail document and write on the printed document in the same way as for the fax, and then merely drop the document into the present inventive device, and the present invention determines the address or addresses where the document is to be sent by e-mail.

It should be noted that a plurality of different communication marks may be disposed on the document indicating a plurality of different addresses to which to send the communication. The user could either place an indicating mark near or around the communication mark or communication addresses to which the device should send, or, alternatively could cross-out the addresses or communication marks to which the device should not send the document. The software could include recognition programming to recognize these user indications. This technique would be particularly useful where the fax or the e-mail has a header associated with it that indicates where the fax or the e-mail came from and where it had been sent. When the user desires to reply to the fax or to the e-mail, the user can simply circle or otherwise mark those addresses to which the communication device should send the document, or cross out those addresses or communication marks where the document is not to be sent.

It should be noted that a single communication mark could contain both fax and e-mail addresses. Alternatively, a plurality of communication marks could be disposed on the document, with each of the communication marks containing an address for a different communication mode, such as a fax or an e-mail address(es). By way of example, the user may have received a fax or an e-mail communication that had been sent to many people. Some of these people may have received the document by fax communication mode, and some of these people may have received the document by e-mail communication mode. All of these addresses can be embedded in one or more communication marks in the document the user received. When the user replies, the present inventive device would detect the one or more communication marks and decode all of the fax and e-mail addresses to which the original document was sent, and then send back a reply to all of those e-mail and fax addressees automatically.

Alternatively, a user may need to fax a document to five different people and e-mail the document to three different people. The five faxed addresses and the three e-mail addresses could all be embedded by the user in the document via one or a plurality of communication marks, and the present inventive device would locate those communication marks and determine the five faxed addresses and the three e-mail addresses and send communications to those addresses. The user could then expect automatically addressed replies from these recipients.

Alternatively, the present inventive device can be utilized to simply capture from one or more communication marks all of the address information and communication mode information needed to send a response to the originator or a list of people that the document was or is to be sent to. This information could then be stored and used as addresses for a new document to be inputted by the user at a future time. This addressing information could be printed on a separate cover sheet that the user can use with the new document that it wishes to send back to the addressees. The storage of the address information at the inventive device allows the user to respond at his own convenience. The user can indicate to the inventive device to use the captured address information by pushing a button, or by a voice command, or by indicating by some other means that the address information is to be used. Alternatively, this address and mode of communication information could be stored in a PC or other convenient device. The user can then indicate to this other device which addressee list to use with the sending device. As noted previously, the user would have the option of selectively using part of the information that is stored, and adding or deleting from this information that is stored.

The present invention may be utilized with a variety of different communication modes including voice-mail phone numbers. Note that the communication markings would be designed to be embedded in the voice mail communication.

It should be noted that although the display of the addresses to the user that were obtained directly or indirectly from the communication mark or marks and the ability to add or delete addresses was disclosed as being provided in the processor block 14 that contains the processing unit with the communication mark detector, decoder and storage device, the address book of a PDA, or a PC or any other means may be utilized to display addresses and to add addresses or delete addresses to which a document is to be sent. Accordingly, the present invention can be used for any type of communication between people, devices or a combination of people and devices.

An advantage of the present invention is that the user is not required to manually enter addresses of where the document is to be sent by using a control panel. The device of the present invention can be used to determine where to send fax-back communications, e-mail-back communications and voice mail-back communications because the communication data is on the document that was received. Whether the document is being sent for the first time or is being replied to, a communication mark may be added to the document with the necessary addresses, avoiding the requirement of inputting those addresses from a control panel. Because the device of the present invention can determine where to send documents, the process of replying to fax and e-mail and other modes of communication is now automated. It should be noted that even in the case of handwriting addresses onto a document, this operation can be easier for the user than punching addresses from the control panel of a communication device. Importantly, even if the communication device does not have a control panel, the user still has a way of entering an address that will be decodable by the communication device.

A significant aspect of the present invention is the facilitated ability to have a communication-back feature. Accordingly, for communications received, a faxed-back or an e-mail-back feature allows the user to have an easy method of sending responses to the originator of a fax or an e-mail without having to know or to reenter that persons fax number or e-mail address. This invention is particularly advantages where a plurality of different addresses are contained in the communication mark, because automatic responses can be made to all of these addressees without the requirement of keying in the addresses.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A method for providing automatic communication addressing comprising the steps of:

locating a communication mark, if one is present, on a medium containing information at a final addressee destination sent from sending party;

obtaining at least one communication address directly or indirectly from said communication mark, the at least one communication address being different from that of the final addressee destination;

inputting said communication address into an address function of a communication device; and initiating a communication of said information to said communication address through said communication device;

wherein said communication mark includes a first communication address for a first communication mode, and a second communication address for a second different type of communication mode;

further comprising the steps of determining if said communication mode for said first communication address is available at said communication device; and when it is determined that said communication mode for said first communication address is not available at said communication device, sending said second communication address for the second different type of communication mode and said information to the communication device.

2. A method as defined in claim 1, wherein said locating step comprises scanning said medium.

3. A method as defined in claim 1, wherein said locating step comprises the step of locating said communication mark at a predetermined location on said medium.

4. A method as defined in claim 1, wherein said locating step comprises locating an address relative to a predetermined mark on said medium.

5. A method as defined in claim 1, wherein said step of obtaining comprise obtaining the at least one Internet address directly from said communication mark.

6. A system for providing automatic communication addressing comprising:

logic for locating a non-text/image communication mark, if one is present, on a medium containing information which has been sent to a final addressee destination from a sending party;

logic for obtaining at least one communication address directly or indirectly from said communication mark, the at least one communication address being different from that of the final addressee destination;

logic for inputting said communication address into an address function of a communication device; and logic for initiating a communication of said information to said communication address through said communication device;

wherein said communication mark includes a first communication address for a first communication mode, and a second communication address for a second different type of communication mode;

further comprising:

logic for determining if said communication mode for said first communication address is available at said communication device; and logic for, when it is determined that said communication mode for said first communication address is not available at said communication device, sending said second communication address for the second different type of communication mode and said information to the communication device.

7. A program product including machine readable program code for causing a machine to perform the following method steps for providing automatic communication addressing:

locating a non-text/image communication mark, if one is present, on a medium containing information which has been sent to a final addressee destination from a sending party;

obtaining at least one communication address directly or indirectly from said communication mark, the at least one communication address being different from that of the final addressee destination;

inputting said communication address into an address function of a communication device; and initiating a communication of said information to said communication address through said communication device;

wherein said communication mark includes a first communication address for a first communication mode, and a second communication address for a second different type of communication mode;

further comprising the steps of:

determining if said communication mode for said first communication address is available at said communication device; and when it is determined that said communication mode for said first communication address is not available at said communication device, sending said second communication address for the second different type of communication mode and said information to the communication device.

8. A program product as defined in claim 7, wherein said step of obtaining the at least one Internet address obtains the at least one internet address directly from said communication mark.

* * * * *